United States Patent
Chen et al.

(10) Patent No.: US 10,747,454 B1
(45) Date of Patent: Aug. 18, 2020

(54) DATA STORAGE SYSTEMS AND METHODS FOR SELF ADAPTIVE CHIP-ENABLE SETUP TIME

(71) Applicant: Western Digital Technologies, Inc., San Jose, CA (US)

(72) Inventors: Niang-Chu Chen, Irvine, CA (US); Jun Tao, Ladera Ranch, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/259,828

(22) Filed: Jan. 28, 2019

(51) Int. Cl.
*G06F 3/06* (2006.01)
*G06F 11/30* (2006.01)

(52) U.S. Cl.
CPC ............ *G06F 3/0632* (2013.01); *G06F 3/061* (2013.01); *G06F 3/0634* (2013.01); *G06F 3/0659* (2013.01); *G06F 3/0679* (2013.01); *G06F 11/3034* (2013.01); *G06F 2201/88* (2013.01)

(58) Field of Classification Search
CPC .... G06F 3/0632; G06F 3/0659; G06F 3/0679; G06F 3/061; G06F 3/0634; G06F 11/3034; G06F 2201/88
See application file for complete search history.

(56) References Cited

U.S. PATENT DOCUMENTS

| 2004/0021711 | A1* | 2/2004 | Hasseler | ................. | B41J 2/175 347/7 |
| 2012/0194865 | A1* | 8/2012 | Kim | ................... | H04N 1/00408 358/1.15 |
| 2015/0142914 | A1* | 5/2015 | Lau | ........................ | H04B 7/024 709/217 |

* cited by examiner

Primary Examiner — Hiep T Nguyen
(74) Attorney, Agent, or Firm — Morgan, Lewis & Bockius LLP

(57) ABSTRACT

Apparatus, media, methods, and systems for data storage systems and methods for self-adaptive chip-enable setup time. A data storage system may comprise one or more non-volatile memory device and a controller. The controller is configured to determine whether a command to a first non-volatile memory device of the one or more non-volatile memory devices is dropped. The controller is configured to, when the command to the first non-volatile memory device is determined to be dropped, update a first counter value indicating a number of commands to the first non-volatile memory device that are dropped. The controller is configured to, when the command to the first non-volatile memory device is determined to be dropped, increase a value of a chip-enable setup time parameter for the first non-volatile memory device by a first time duration, based on at least one of the first counter value and one or more parameter values of the first non-volatile memory device.

17 Claims, 4 Drawing Sheets

US 10,747,454 B1

DATA STORAGE SYSTEMS AND METHODS FOR SELF ADAPTIVE CHIP-ENABLE SETUP TIME

BACKGROUND

Generally, a non-volatile memory device is not in a stable state by the time a command is received by the non-volatile memory device. The time required for a non-volatile memory device to reach a stable state may be affected by various factors, including, but not limited to operational environment of the data storage system, quality of the non-volatile memory device, and the like. One of the consequences of not providing a stable state by the time a command is received is that a command or a portion of a command may be dropped and not successfully executed. The dropping of commands may result in stale data being transferred to the host system and may cause irreversible data corruption.

The description provided in the background section should not be assumed to be prior art merely because it is mentioned in or associated with the background section. The background section may include information that describes one or more aspects of the subject technology, and the description in this section does not limit the invention.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject disclosure and is not intended to represent the only configurations in which the subject disclosure may be practiced. The appended drawings are incorporated herein and constitute a part of the detailed description. The detailed description includes specific details for the purpose of providing a thorough understanding of the subject disclosure. However, it will be apparent to those skilled in the art that the subject disclosure may be practiced without these specific details. In some instances, structures and components are shown in block diagram form in order to avoid obscuring the concepts of the subject disclosure. Like components are labeled with identical element numbers for ease of understanding.

Figure 1:
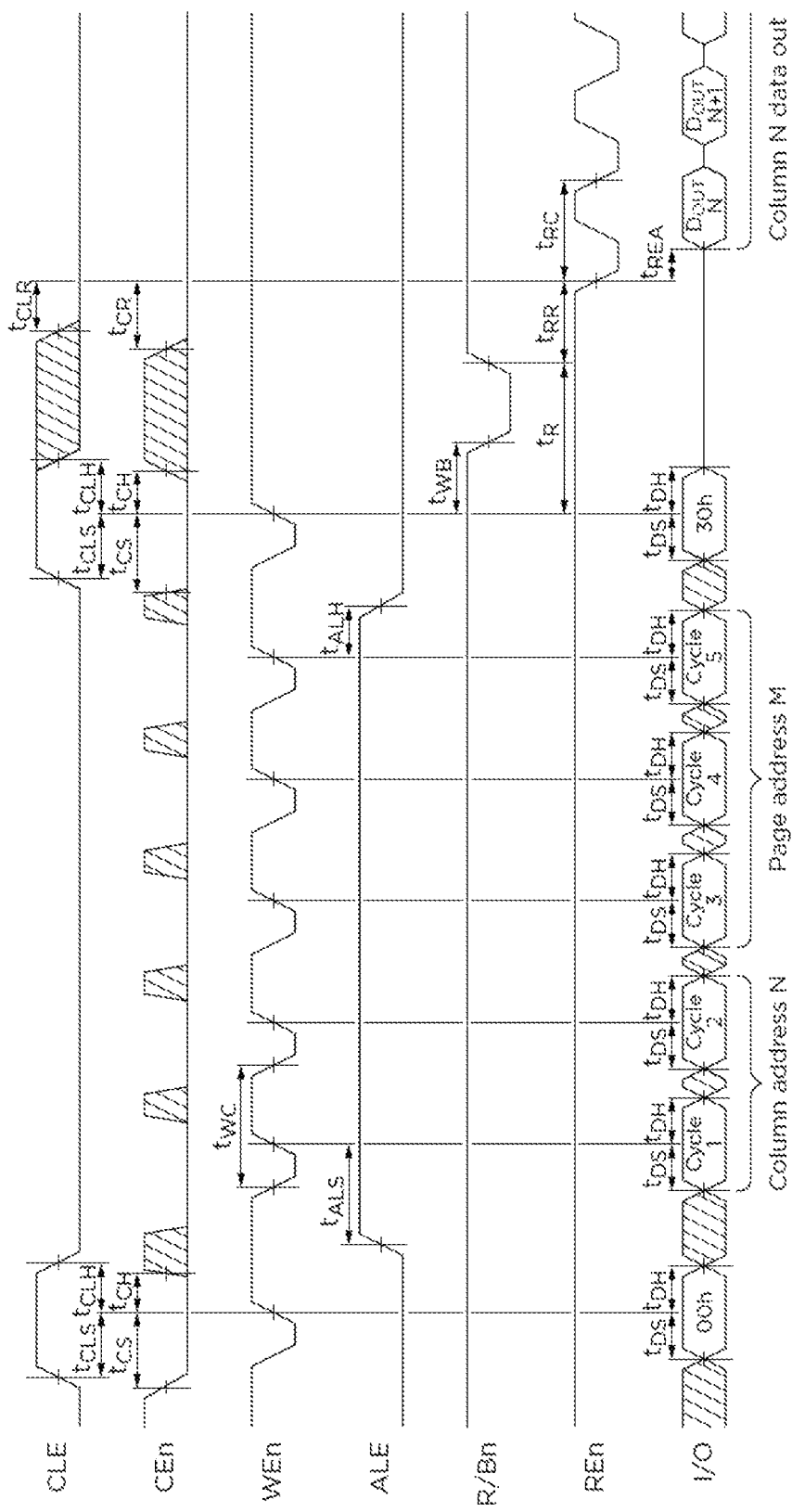
FIG. 1 depicts an example graph diagram illustrating a timing diagram of signals provided for a non-volatile memory device.

The present description relates in general to data storage systems and methods, and more particularly to, for example, without limitation, data storage systems and methods for a self-adaptive chip-enable setup time. A non-volatile memory device, such as a NAND flash memory device, generally, may be in a stable state to successfully execute a command sent to the non-volatile memory device. In some implementations, a successful execution of a command may be executing of a command without any portion of the command being dropped. The time for a non-volatile memory device to transition from an idle state to a stable state may be represented by a value of the chip-enable setup time parameter of the non-volatile memory device. For example, as shown in the timing diagram illustrated in FIG. 1, the value represented by notation tcs of the chip-enable (CEn) signal is a value of the chip-enable setup time parameter, and it represents the maximum amount of time that non-volatile memory device has to transition from an idle state to a stable state. As illustrated in FIG. 1, a non-volatile memory device may be provided with various other signals, such as a command latch enable (CLE) signal, a write enable (WEn) signal, an address enable (ALE) signal, a ready busy (R/Bn) signal, and a read enable (REn) signal so that input/output (I/O) may be processed based on the chip-enable signal as well as these other signals.

In some previously implemented techniques, the value of a chip-enable setup time parameter of every non-volatile memory device of a data storage system may be predetermined to be the same value. Such value of the chip-enable setup time parameter may not be based on any manufacturing variance of the non-volatile memory device or any specific characteristics of the non-volatile memory device. Moreover, in response to a determination that a command to a non-volatile memory device is dropped, the value of the chip-enable setup time parameter is increased to a value that is large enough to cover all possible error causes. However, increasing the value of the chip-enable setup time parameter to such a large value results in increasing the execution time of the commands. Thus, such increases in the chip-enable setup time parameter may reduce the performance of the data storage system.

One or more implementations of the subject technology provide data storage systems, methods, and techniques that determine a default value of a chip-enable setup time parameter based on a manufacturing variance of the non-volatile memory device and calibration of the non-volatile memory device to a set of benchmark values. A controller of a data storage system may be configured to determine whether or not a command to a non-volatile memory device is dropped, and, in response, the controller may be configured to adjust the value of the chip-enable setup time parameter of the non-volatile memory device.

Figure 2:
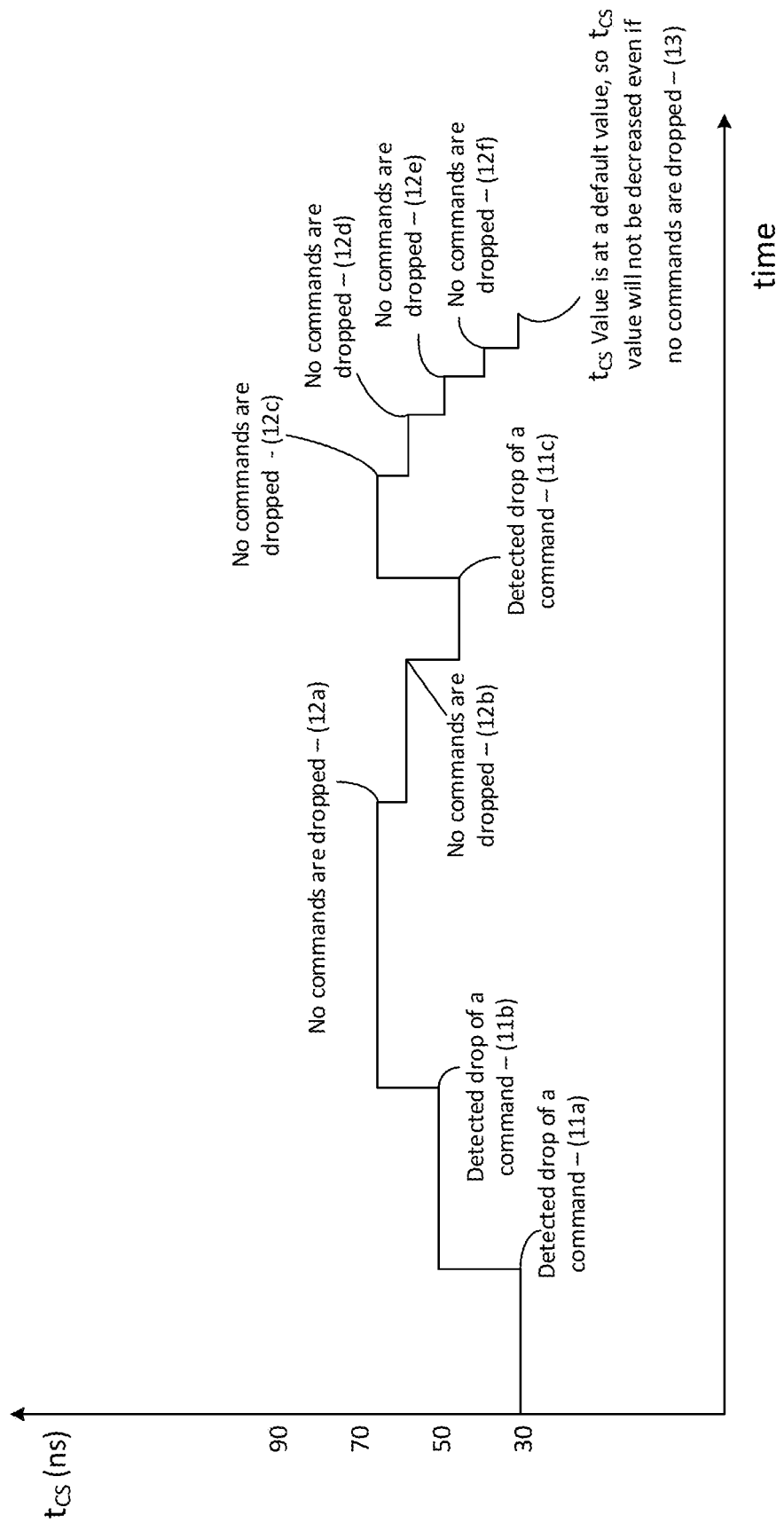
FIG. 2 depicts an example graph diagram illustrating changes to a value of a chip-enable setup time parameter of a non-volatile memory device based on whether commands to that non-volatile memory device are successfully executed.

For example, as shown in FIG. 2, a value of the chip-enable setup time parameter of a non-volatile memory device may be increased based on a determination that a command to the non-volatile memory device is dropped (see, e.g., 11a, 11b, 11c). Such value may be decreased when an update condition is satisfied (e.g., if a threshold number of commands are not dropped or if commands are not dropped for a period of time) (see, e.g., 12a, 12b, 12c, 12d, 12e, 12f). However, if the chip-enable setup time parameter value is already at the default value, then the chip-enable setup time parameter value is not decreased even if an update condition is satisfied (see, e.g., 13).

The amount of increases and decreases in the value of the chip-enable setup time parameter may be determined based on manufacturing variance of the non-volatile memory device and calibration of the non-volatile memory device to a set of benchmark values. The amount the value of the chip-enable setup time parameter is decreased may be a fraction of the amount the value of chip-enable setup time parameter is increased. Additional details of determining whether a command to the non-volatile memory device is dropped and adjusting the values of the chip-enable setup time parameter are described in detail below and herein.

Figure 3:
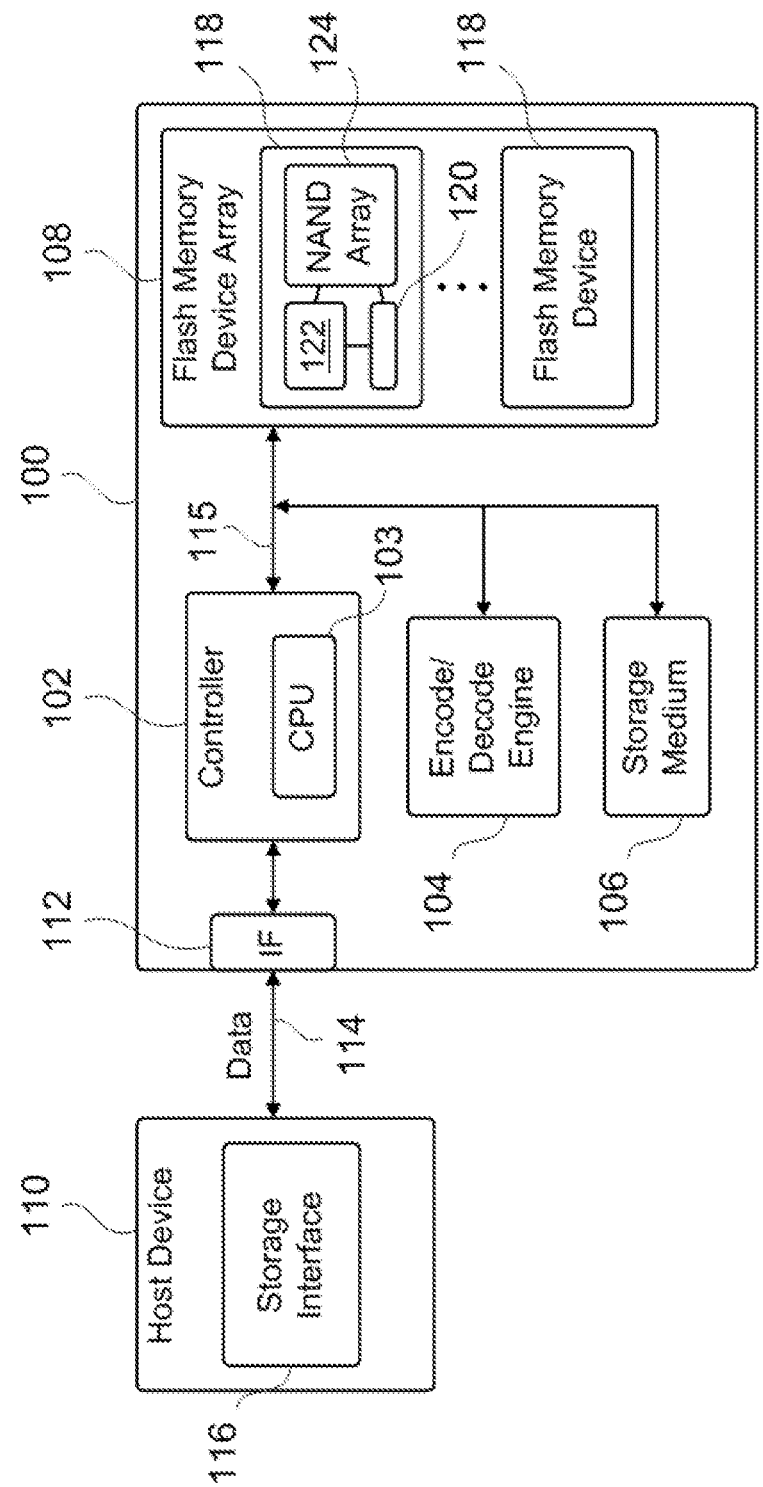
FIG. 3 is a block diagram illustrating components of a data storage system according to illustrative implementations.

FIG. 3 is a block diagram depicting example components of a data storage system 100, according to one or more aspects of the subject technology. Data storage system 100 includes, among other things, controller 102, encode/decode engine 104, storage medium 106, and non-volatile memory device array 108. As depicted in FIG. 3, data storage system 100 may be connected to a host device 110 via host interface 112.

Controller 102 may include several internal components (not shown) such as one or more processors 103, a read-only memory, a non-volatile component interface (for example, a multiplexer to manage instruction and data transport along a connection to non-volatile memory device array 108), an I/O interface, error correction circuitry, and the like. A processor of controller 102 may monitor and control the operation of the components in data storage controller 102. The processor and/or controller 102 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. In some implementations, one or more elements of controller 102 may be integrated into a single chip. In some implementations, the elements may be implemented on two or more discrete components.

Controller 102 may execute code or instructions to perform the operations and functionality described herein. For example, controller 102 may perform operations for managing request flow and address mappings, and to perform calculations and generate commands. One or more sequences of instructions may be stored as firmware on memory within controller 102. One or more sequences of instructions may be software stored and read from storage medium 106, non-volatile memory device array 108, or received from host device 110 (for example, via host interface 112). Storage medium 106 and non-volatile memory device array 108 include examples of machine or computer readable media on which instructions/code executable by controller 102 may be stored. Machine or computer readable media may generally refer to any tangible and non-transitory medium or media used to provide instructions to controller 102, including both volatile media, such as dynamic memory used for storage media or for buffers within controller 102, and non-volatile media, such as electronic media, optical media, and magnetic media. The operations and functionality described herein also may be implemented in hardware using logic circuits, for example, or a combination of hardware and software/firmware.

In some aspects, storage medium 106 represents the volatile memory used to temporarily store data and information used to manage data storage system 100. According to aspects of the present disclosure, storage medium 106 is a random access memory (RAM) such as double data rate (DDR) RAM. Other types of RAM also may be used to implement storage medium 106. Storage medium 106 may be implemented using a single RAM module or multiple RAM modules. While storage medium 106 is depicted as being distinct from controller 102, it is understood that storage medium 106 may be incorporated into controller 102 without departing from the scope of the present disclosure. Alternatively, storage medium 106 may be a non-volatile memory such as a magnetic disk, flash memory, peripheral SSD, and the like.

Host interface 112 may be coupled to host device 110, to receive data from and send data to host device 110. Host interface 112 may include both electrical and physical connections for operably coupling host device 110 to controller 102. Host interface 112 may communicate data, addresses, and control signals between host device 110 and controller 102. In this manner, controller 102 may store data received from host device 110 in non-volatile memory device array 108 in response to a write command from host device 110, and to read data stored in non-volatile memory device array 108 and to transfer the read data to host device 110 via host interface 112 in response to a read command from host device 110.

Host device 110 represents any device that may be coupled to data storage system 100 and to store data in data storage system 100. Host device 110 may be a computing system such as a personal computer, a server, a workstation, a laptop computer, PDA, smart phone, and the like. Alternatively, host device 110 may be an electronic device such as a digital camera, a digital audio player, a digital video recorder, and the like.

As further depicted in FIG. 3, host device 110 and data storage system 100 may be in communication with each other via a bus 114. The bus may use suitable interfaces standard including, but not limited to, serial advanced technology attachment (SATA), advanced technology attachment (ATA), small computer system interface (SCSI), PCI-extended (PCI-X), fiber channel, serial attached SCSI (SAS), secure digital (SD), embedded multi-media card (EMMIC), universal flash storage (UFS) and peripheral component interconnect express (PCIe). According to some aspects, data storage system 100 may include pins (or a socket) to mate with a corresponding socket (or pins) on host device 110 to establish an electrical and physical connection.

Controller may include an internal system bus 115. System bus 115 may include a combination of a control bus, address bus, and data bus, and connect the components of controller 102 (e.g., a processor and/or memory therein) with other components of data storage system 100, including encode/decode engine 104, storage medium 106, non-volatile memory device array 108, and host interface 112. Data is transferred between the various components over system bus 115. System bus 115 may reside partially external and partially internal to controller 102.

Host device 110 and data storage system 100 may be in communication with each other via a wired or wireless connection and may be local to or remote from one another. According to one or more other aspects, data storage system 100 (or host interface 112) includes a wireless transceiver to place host device 110 and data storage system 100 in wireless communication with each other.

Controller 102 may receive data and/or storage access commands from a storage interface module 116 (e.g., a device driver) of host device 110. Storage access commands communicated by the storage interface module 116 may include read and write commands issued by the host device 110. Read and write commands may specify a logical address, e.g., logical block addresses (LBAs) used to access data stored in the data storage system 100. Controller 102 may execute commands in the non-volatile memory device array 108 in response to commands received from storage interface module 116.

Non-volatile memory device array 108 may include multiple non-volatile memory devices 118. A non-volatile memory device 118 represents a non-volatile memory device for storing data. According to aspects of the subject technology, non-volatile memory device 118 includes, for example, a NAND flash memory. Each non-volatile memory device 118 may include a single non-volatile memory chip or die, or may include multiple non-volatile memory chips or die. For example, within non-volatile memory device array 108, some of the non-volatile memory devices 118 may comprise one non-volatile die while others may comprise more than one non-volatile die. Non-volatile memory device 118 is not limited to any particular capacity or configuration. For example, the number of physical blocks, the number of physical pages per physical block, the number of sectors per physical page, and the size of the sectors may vary within the scope of the subject technology.

Non-volatile memory devices 118 may be arranged in multiple channels, with each channel having one or more non-volatile memory devices 118. A non-volatile memory device 118 may include one or more non-volatile memory interfaces (not shown). Each non-volatile memory interface interfaces the controller 102 to one of the non-volatile memory devices via a corresponding channel. Each of the channels (not shown) may be implemented using one or more physical I/O buses coupled between one of the non-volatile memory interfaces and the corresponding non-volatile device(s). Each channel allows the corresponding non-volatile memory interface to send read, write and/or erase commands to the corresponding non-volatile memory device. Each non-volatile memory interface may include a register (e.g., First-In-First-Out (FIFO) register) that queues read, write and/or erase commands from the controller 102 for the corresponding non-volatile memory device. Although the term "channel," as used above, referred to the bus coupled between a non-volatile memory interface and the corresponding non-volatile memory device, the term "channel" may also refer to the corresponding non-volatile memory device that is addressable through a bus (e.g., system bus 115).

Non-volatile memory device 118 may have a standard interface specification. This standard ensures that chips from multiple manufacturers can be used interchangeably. The interface of non-volatile memory device 118 may be used to access internal registers 120 and an internal non-volatile memory controller 122. In some implementations, registers 120 may include address, command, and/or data registers, which internally retrieve and output the necessary data to and from a NAND memory cell array 124. By way of example, memory cell array 124 may comprise a single-level cell (SLC) memory, a multi-level cell (MLC) memory, a three-level cell (TLC) memory device, etc. In some aspects, the non-volatile memory device array 108 may comprise one or more hybrid memory devices that may function in one or more of a SLC, MLC or TLC mode. Other types of non-volatile memory such as 3D NAND flash memory also are contemplated in the subject technology.

Data register (e.g., of registers 120) may include data to be stored in memory cell array 124, or data after a fetch from memory cell array 124, and may also be used for temporary data storage and/or act like a buffer. An address register may store the memory address from which data will be fetched to host device 110 or the address to which data will be sent and stored. In some aspects, a command register is included to control parity, interrupt control, and the like. In some aspects, internal non-volatile memory controller 122 is accessible via a control register to control the general behavior of non-volatile memory device 118. Internal non-volatile controller 122 and/or the control register may control the number of stop bits, word length, receiver clock source, and may also control switching the addressing mode, paging control, co-processor control, and the like.

Encode/decode engine 104 represents one or more components that may encode and/or decode code words to be stored in and/or read from the non-volatile memory device array 108. Encode/decode engine 104 may include an encoder and a decoder. The decoder may include a hard decoder and a soft-decision ECC decoder. Encode/decode engine 104 may encode data received from host device 110 and decode code words read from the non-volatile memory device 118 before sending the decoded data to the host. In some implementations, encode/decode engine 104 may comprise one or more memory devices and/or one or more processing units used to perform error correction (e.g., using LDPC, BCH, or turbo codes). Encode/decode engine 104 may also include a soft information module that determines and/or maintains soft metric inputs for encoding and decoding operations. While encode/decode engine 104 is depicted as being distinct from controller 102, it is understood that encode/decode engine 104 may be incorporated into controller 102 without departing from the scope of the present disclosure.

Each non-volatile memory device 118 may be configured to operate based on a value of a chip-enable setup time parameter. As described above, the value of the chip-enable setup time parameter is the period of time during which the non-volatile memory device 118 transitions from an idle state to a stable state. For each of the non-volatile memory devices 118, a particular default value for the chip-enable setup time parameter may be determined. The default value of the chip-enable setup time parameter of each non-volatile memory devices 118 may be different. The default values of the chip-enable setup time parameter of each of the non-volatile memory devices 118 may be selected based on a calibration of each of the non-volatile memory devices 118 to a benchmark set of values. The calibration of the non-volatile memory devices 118 is performed based on manufacturing variance of the particular non-volatile memory device 118. The default values of the chip-enable setup time parameter of each of the non-volatile memory device 118 may be stored in a data structure, such as a table, in the data storage system 100. For example, the data structure with the default values of the chip-enable setup time parameter may be stored in the storage medium 106.

Figure 4:
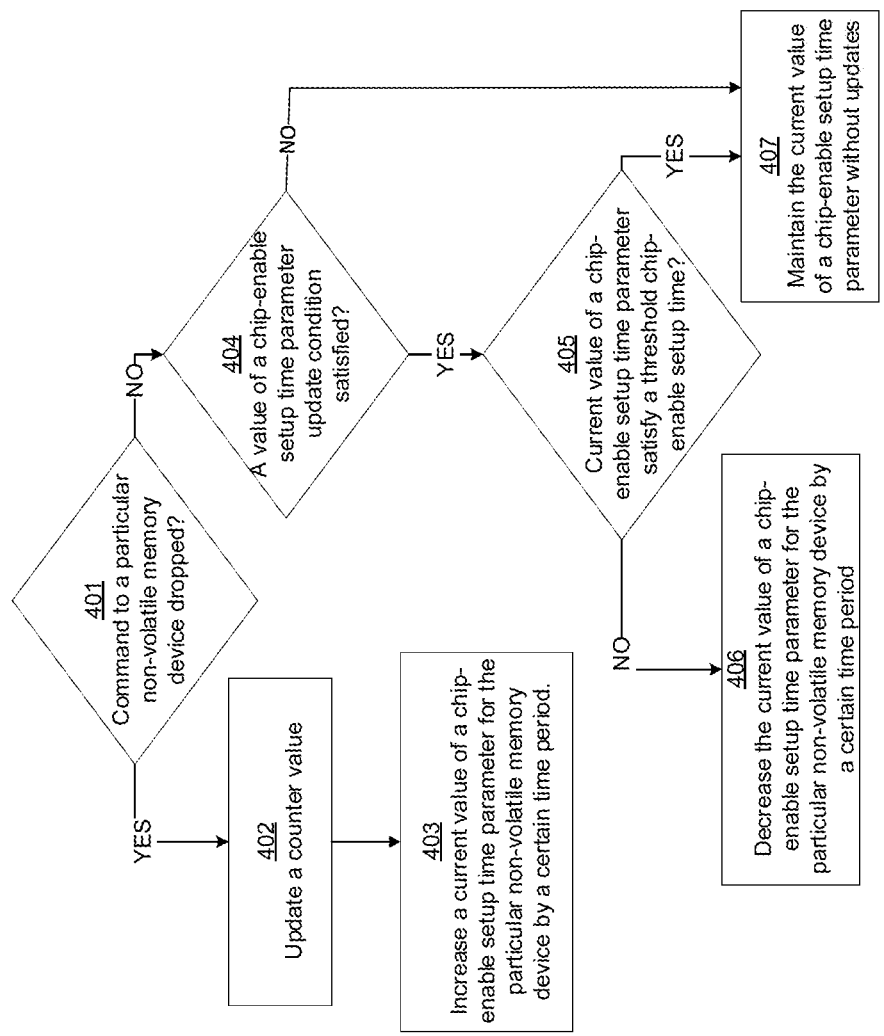
FIG. 4 is a flow chart of an example method of adjusting a value of a chip-enable setup time parameter of a non-volatile memory device.

Turning now to FIG. 4, there is shown a flowchart illustrating a process of adjusting a value of a chip-enable setup time parameter. For the purpose of illustrating a clear example, components of the data storage system 100 shown and described with reference to FIG. 3 are used to describe the process of adjusting a value of a chip-enable setup time parameter.

The method 400 includes determining whether a command to a particular non-volatile memory device, such as non-volatile memory devices 118, has been dropped (block 401). The controller 102 may be configured to determine whether a command to a particular non-volatile memory device 118 using various methods. For example, for a write command, the controller 102 may be configured to include a logical block address with data of while storing the data in a particular non-volatile memory device 118, and the controller 102 may be configured to determine whether the write command was dropped by reading the stored data from the non-volatile memory device 118 and determining that the logical block address in the data read from the non-volatile memory device matches the logical block address stored with the data while storing the data in the non-volatile memory device 118.

If the controller 102 determines that the command to the particular non-volatile memory device 118 is dropped (YES' at block 401), the method 400 continues to block 402. The controller 102 updates a counter value (block 402). The counter is associated with the particular non-volatile memory device 118, and the value of the counter indicates a number of commands dropped. In some implementations, such a counter may be referred to as a command-drop counter. Each non-volatile memory device 118 may be associated with a particular command-drop counter and the value of the command-drop counter indicates the number of commands to that particular non-volatile memory device 118 that were dropped. In some implementations, the value of the counter may represent a number of commands dropped over a certain period of time. In some implementations, the value of the counter may be reset to zero if a threshold number of consecutive commands were successfully executed without any of the commands being dropped.

The controller 102 increases a current value of the chip-enable setup time parameter for the particular non-volatile memory device 118 by a certain time period (block 403). In some implementations, the controller 102 may be configured to determine the certain time period based on a threshold value. For example, the threshold value may be 10 nanoseconds (ns), and the controller 102 may be configured to determine the certain time period to be 10 nanoseconds and increase the current value of the chip-enable setup time parameter by 10 nanoseconds. In some implementations, the threshold value may be predetermined based on a calibration of the particular non-volatile memory device 118 to a benchmark set of values, where the calibration of the particular non-volatile memory device 118 is performed based on manufacturing variance of the particular non-volatile memory device 118. In some implementations, the controller 102 may be configured to determine the certain time period based on the value of the counter. For example, if the counter value indicates that one command to the non-volatile memory device 118 is dropped, then the controller 102 may be configured to determine the certain time period as 10 nanoseconds. Similarly, if the counter value indicates that two commands to the non-volatile memory device 118 are dropped, then the controller 102 may be configured to determine that the certain time period as 30 nanoseconds, and if the counter value indicates that three commands to the non-volatile memory device 118 are dropped, then the controller 102 may be configured to determine that the certain time period as 40 nanoseconds.

The controller 102 may be configured to store the updated value of the chip-enable setup time parameter in a data structure, such as a table, configured to the store the values of the chip-enable setup time parameter. For example, the controller 102 may be configured to store the updated value of the chip-enable setup time parameter in a table and store the table in a storage medium, such as the storage medium 106. In some implementations, the data storage system 100 may be configured to maintain a data structure for each non-volatile memory device 118 in the data storage system 100 and the data structure may be associated with the non-volatile memory device 118. The controller 102 may be configured to store the updated value of the chip-enable setup time parameter in the data structure associated with the non-volatile memory device 118. The controller 102 may be configured to store the values of the chip-enable setup time parameter in the associated data structure over the lifetime of the non-volatile memory device 118.

If the controller 102 determines that the command to the non-volatile memory device 118 is not dropped (NO' at block 401), then the method continues to block 404. The controller 102 determines whether a chip-enable setup time update condition is satisfied (block 404). In some implementations, the chip-enable setup time update condition may be a threshold period of time during which a command to a non-volatile memory device 118 is not dropped.

For example, the controller 102 may be configured to determine a duration of time that has elapsed since the last time a command to the non-volatile memory device 118 is dropped, and determine whether the duration of time satisfies (e.g., greater than or equal to) the threshold period of time.

In some implementations, the chip-enable setup time update condition may be a threshold number of commands (e.g., 1000 commands) to a non-volatile memory device 118 that were successfully executed without being dropped. For example, if such an update condition is 1000 commands, then the controller 102 may be configured to determine a number of commands to the non-volatile memory device 118 that were successfully executed without being dropped and determine whether the number of commands satisfies (e.g., greater than or equal to) the update condition, 1000 commands.

The controller 102 may be configured to maintain and/or update a counter for each non-volatile memory device 118 to track the number of commands that were successfully executed without being dropped. In some implementations, such a counter may be referred to as a successfully-executed command counter. In some implementations, the successfully-executed command counter may be associated with the particular non-volatile memory device 118, and each non-volatile memory device 118 of the data storage system 100 may be associated with a distinct successfully-executed command counter. In some implementations, the chip-enable setup time update condition may be a threshold number of consecutive commands (e.g., 1000 consecutive commands) to the non-volatile memory device 118 that were successfully executed without being dropped, and the controller 102 may be configured to determine that the consecutive number of commands to the non-volatile memory device 118 that were successfully executed satisfies (e.g., greater than or equal to) the chip-enable setup time update condition (e.g., 1000 consecutive commands).

In some implementations, the controller 102 may be configured to determine a consecutive number of commands to the non-volatile memory device 118 that were successfully executed without being dropped using a counter. In some implementations, such a counter may be referred to as a successfully-executed consecutive command counter. In some implementations, the successfully-executed consecutive command counter may be associated with the particular non-volatile memory device 118, and each non-volatile memory device 118 of the data storage system 100 may be associated with a distinct successfully-executed consecutive command counter.

If the controller 102 determines that the chip-enable setup time update condition is not satisfied (NO' at block 404), then the method 400 proceeds to block 407. The controller 102 maintains the current chip-enable time value without any updates to the value of the chip-enable setup time parameter. In some implementations, the controller 102 may be configured to associate the current value of the chip-enable setup time parameter with a current time period and store the current value of the chip-enable setup time parameter and the current time period in a data structure. If the controller 102 determines that the chip-enable setup time update condition is satisfied (YES' at block 404), then the method 400 proceeds to block 405. The controller 102 determines whether the current chip-enable setup time satisfy a threshold chip-enable setup time (block 405). For example, the controller 102 may be configured to determine whether a value of the current chip-enable setup time satisfies (e.g., equal to or less than) a threshold value of the chip-enable setup time parameter. In some implementations, the threshold value of the chip-enable setup time parameter may be a default value of the chip-enable setup time parameter.

If the controller 102 determines that the current value of the chip-enable setup time parameter satisfies the threshold value of the chip-enable setup time parameter (YES' at block 405), then the method 400 proceeds to block 407. If the controller 102 determines that the current value of the chip-enable setup time parameter does not satisfy (e.g., greater than) the threshold value of the chip-enable setup time parameter (NO' at block 405), then the method 400 proceeds to block 406. The controller 102 decreases the current value of the chip-enable setup time parameter for the particular non-volatile memory device 118 by a certain time period. In some implementations the certain time period may be a default time period. In some implementations, the controller 102 may be configured to determine the certain time period based on a counter that indicates a number of commands to the particular non-volatile memory device 118 that are successfully executed without being dropped and/or on a counter that indicates a consecutive number of commands to the particular non-volatile memory device 118 that are successfully executed without being dropped. As described above, in some implementations, such counters may be referred to as a successfully-executed command counter and successfully-executed consecutive command counter.

An example illustration of the method 400 of adjusting or updating the value of a chip-enable setup time parameter of a particular non-volatile memory device 118 is shown in FIG. 2.

The blocks of the flowchart illustrated in FIG. 4 have been described as occurring sequentially. The subject technology is not limited to the described sequential performance of the illustrated process. One or more of the blocks may be performed in parallel with other blocks in the illustrated process. Other variations in the illustrated process are within the scope of the subject technology. In one or more implementations, a command may refer to one or more commands.

Various examples of aspects of the disclosure are described below. These are provided as examples, and do not limit the subject technology.

In one or more implementations, a data storage system includes one or more non-volatile memory devices and a controller. The controller is configured to determine whether a command to a first non-volatile memory device of the one or more non-volatile memory devices is dropped. The controller is configured to, when the command to the first non-volatile memory device is determined to be dropped, update a first counter value indicating a number of commands to the first non-volatile memory device that are dropped. The controller is configured to, when the command to the first non-volatile memory device is determined to be dropped, increase a value of a chip-enable setup time parameter for the first non-volatile memory device by a first time duration, based on at least one of the first counter value and one or more parameter values of the first non-volatile memory device.

In one or more implementations, a computer implemented method includes determining whether a command to a first non-volatile memory device of one or more non-volatile memory devices is dropped. The method includes, in response to determining that the command to the first non-volatile memory device is dropped, updating a first counter value indicating a number of commands to the first non-volatile memory device that are dropped. The method includes, in response to determining that the command to the first non-volatile memory device is dropped, increasing a value of a chip-enable setup time parameter for the first non-volatile memory device by a first time duration, based on at least one of the first counter value and one or more parameter values of the first non-volatile memory device.

In one or more implementations, a data storage system includes one or more non-volatile memory devices. The data storage system includes means for determining whether a command to a first non-volatile memory device of the one or more non-volatile memory devices is dropped. In response to determining that the command to the first non-volatile memory device is dropped, the data storage system includes means for updating a first counter value indicating a number of commands to the first non-volatile memory device that are dropped. In response to determining that the command to the first non-volatile memory device is dropped, the data storage system includes means for increasing a value of a chip-enable setup time parameter for the first non-volatile memory device by a first time period, based on at least one of the first counter value and one or more parameter values of the first non-volatile memory device.

In one or more implementations, a non-transitory machine-readable medium includes machine-executable instructions thereon that, when executed by a processor, perform a method. The method includes determining whether a command to a first non-volatile memory device of one or more non-volatile memory devices is dropped. The method includes, in response to determining that the command to the first non-volatile memory device is dropped, updating a first counter value indicating a number of commands to the first non-volatile memory device that are dropped. The method includes, in response to determining that the command to the first non-volatile memory device is dropped, increasing a value of a chip-enable setup time parameter for the first non-volatile memory device by a first time duration, wherein the first time duration is configurable for the first non-volatile memory device, based on at least one of the first counter value and one or more parameter values of the first non-volatile memory device.

It is understood that other configurations of the subject technology will become readily apparent to those skilled in the art from the detailed description herein, wherein various configurations of the subject technology are shown and described by way of illustration. The subject technology is capable of other and different configurations and its several details are capable of modification in various other respects, all without departing from the scope of the subject technology. Accordingly, the drawings and detailed description are to be regarded as illustrative in nature and not as restrictive.

Many of the above-described features of example process and related features and applications, may be implemented as software or firmware processes that are specified as a set of instructions recorded on a processor-readable storage medium (also referred to as computer-readable medium). When these instructions are executed by one or more processing unit(s) (e.g., one or more processors, cores of processors, or other processing units), the processing unit(s) are caused to perform the actions indicated in the instructions. Examples of processor-readable media include, but are not limited to, volatile memory, non-volatile memory, as well as other forms of media such as magnetic media, optical media, and electronic media. The processor-readable media does not include carrier waves and electronic signals communicated wirelessly or over wired connections.

The term "software" is meant to include, where appropriate, firmware residing in memory or applications stored in memory, which may be read into a working memory for processing by a processor. Also, in some implementations, multiple software aspects of the subject disclosure may be implemented as sub-parts of a larger program while remaining distinct software aspects of the subject disclosure. In some implementations, multiple software aspects may also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code).

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject disclosure, and the subject disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader)

A phrase such as an "aspect" does not imply that such aspect is essential to the subject disclosure or that such aspect applies to all configurations of the subject disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject disclosure or that such implementation applies to all configurations of the subject disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A configuration may provide one or more examples. A phrase such as a "configuration" may refer to one or more configurations and vice versa.

The word "exemplary" is used to mean "serving as an example or illustration." Any aspect or design described herein as "exemplary" is not necessarily to be construed as preferred or advantageous over other aspects or designs.

What is claimed is:

1. A data storage system, comprising:
   one or more non-volatile memory devices; and
   a controller,
   wherein the controller is configured to:
      determine whether a command to a first non-volatile memory device of the one or more non-volatile memory devices is dropped;
      when the command to the first non-volatile memory device is determined to be dropped, update a first counter value indicating a number of commands to the first non-volatile memory device that are dropped; and increase, based on at least one of the first counter value and one or more parameter values of the first non-volatile memory device, a value of a chip-enable setup time parameter for the first non-volatile memory device by a first time duration; and when the command to the first non-volatile memory device is determined to be not dropped, update a second counter value associated with the first non-volatile memory device;

determine whether the second counter value satisfies a threshold value; and when the second counter value satisfies the threshold value, decrease the value of the chip-enable setup time parameter for the first non-volatile memory device by a second time duration.

2. The data storage system of claim 1, wherein the controller is configured to:

when the second counter value satisfies the threshold value, determine, based on at least one of one or more of the second counter value, or the one or more parameter values of the first non-volatile memory device, the second time duration.

3. The data storage system of claim 1, wherein the controller is configured to:

when the second counter value satisfies the threshold value, determine whether the value of the chip-enable setup time parameter satisfies a default value of the chip-enable setup time parameter; and when the value of the chip-enable setup time parameter does not satisfy the default value of the chip-enable setup time parameter, decrease the value of the chip-enable setup time parameter by the second time duration.

4. The data storage system of claim 1, wherein the second counter value indicates a number of consecutive commands to the first non-volatile memory device that are not dropped.

5. The data storage system of claim 1, wherein the one or more parameter values are based on at least one of manufacturing variance of the first non-volatile memory device and calibration of the first non-volatile memory device.

6. The data storage system of claim 1, wherein the first time duration is configurable for the first non-volatile memory device, based on at least one of manufacturing variance of the first non-volatile memory device and calibration of the first non-volatile memory device.

7. The data storage system of claim 1, wherein the controller is configured to:

determine whether a command to a second non-volatile memory device of the one or more non-volatile memory devices is dropped; and when the command to the second non-volatile memory device is determined to be dropped, increase, based on at least one of a third counter value and one or more parameter values of the second non-volatile memory device, a value of a chip-enable setup time parameter for the second non-volatile memory device by a third time period, wherein the third time period is different from the first time duration and the third counter value indicates a number of commands to the second non-volatile memory device that are dropped.

8. A computer-implemented method for a data storage system, comprising:

determining whether a command to a first non-volatile memory device of one or more non-volatile memory devices is dropped;

in response to determining that the command to the first non-volatile memory device is dropped:

updating a first counter value indicating a number of commands to the first non-volatile memory device that are dropped; and increasing, based on at least one of the first counter value and one or more parameter values of the first non-volatile memory device, a value of a chip-enable setup time parameter for the first non-volatile memory device by a first time duration, wherein the first time duration is configurable for the first non-volatile memory device; and in response to determining that the command to the first non-volatile memory device is not dropped:

updating a second counter value associated with the first non-volatile memory device;

determining whether the second counter value satisfies a threshold value; and in response to determining that the second counter value satisfies the threshold value:

decreasing the value of the chip-enable setup time parameter for the first non-volatile memory device by a second time duration.

9. The computer-implemented method of claim 8, further comprising:

determining, based on at least one of one or more of the second counter value, or the one or more parameter values of the first non-volatile memory device, the second time duration.

10. The computer-implemented method of claim 8, further comprising:

determining whether the value of the chip-enable setup time parameter satisfies a default value of the chip-enable setup time parameter; and in response to determining that the value of the chip-enable setup time parameter does not satisfy the default value of the chip-enable setup time parameter:

decreasing the value of the chip-enable setup time parameter by the second time duration.

11. The computer-implemented method of claim 8, wherein the second counter value indicates a consecutive number of commands to the first non-volatile memory device that are not dropped.

12. The computer-implemented method of claim 8, wherein the threshold value is a timer value, and the first counter value is associated with the first non-volatile memory device.

13. The computer-implemented method of claim 8, further comprising:

determining whether a command to a second non-volatile memory device of the one or more non-volatile memory devices is dropped; and in response to determining that the command to the second non-volatile memory device is determined to be dropped:

increasing, based on at least one of a third counter value, and one or more parameter values of the second non-volatile memory device, a value of a chip-enable setup time parameter for the second non-volatile memory device by a third time duration, wherein the third time duration is different from the first time duration and the third counter value indicates a number of commands to the second non-volatile memory device that are dropped.

14. A data storage system, comprising:
one or more non-volatile memory devices;
means for determining whether a command to a first non-volatile memory device of the one or more non-volatile memory devices is dropped;
in response to determining that the command to the first non-volatile memory device is dropped:
    means for updating a first counter value indicating a number of commands to the first non-volatile memory device that are dropped; and
    means for increasing, based on at least one of the first counter value and one or more parameter values of the first non-volatile memory device, a value of a chip-enable setup time parameter for the first non-volatile memory device by a first time period; and
in response to determining that the command to the first non-volatile memory device is not dropped:
    means for updating a second counter value associated with the first non-volatile memory device;
    means for determining whether the second counter value satisfies a threshold value; and
    in response to determining that the second counter value satisfies the threshold value:
        means for decreasing the value of the chip-enable setup time parameter for the first non-volatile memory device by a second time period.

15. The data storage system of claim 14, comprising:
means for determining, based on at least one of one or more of the second counter value, or the one or more parameter values of the first non-volatile memory device, the second time period.

16. The data storage system of claim 14, comprising:
means for determining whether the value of the chip-enable setup time parameter satisfies a default value of the chip-enable setup time parameter; and
in response to determining that the value of the chip-enable setup time parameter does not satisfy the default value of the chip-enable setup time parameter:
    means for decreasing the value of the chip-enable setup time parameter by the second time period.

17. The data storage system of claim 14, comprising:
means for determining whether a command to a second non-volatile memory device of the one or more non-volatile memory devices is dropped; and
in response to determining that the command to the second non-volatile memory device is determined to be dropped:
    means for increasing, based on at least one of a third counter value and one or more parameter values of the second non-volatile memory device, a value of a chip-enable setup time parameter for the second non-volatile memory device by a third time period, wherein the third time period is different from the first time period and the third counter value indicates a number of commands to the second non-volatile memory device that are dropped.

\* \* \* \* \*